United States Patent [19]

Wheeler

[11] Patent Number: 4,674,162

[45] Date of Patent: * Jun. 23, 1987

[54] ROTARY SYNCHRONOUS CROSS DRILLING ATTACHMENT

[75] Inventor: Harold E. Wheeler, Athens, Pa.

[73] Assignee: Wheeler Tool Company, Athens, Pa.

[*] Notice: The portion of the term of this patent subsequent to Oct. 14, 2003 has been disclaimed.

[21] Appl. No.: 766,324

[22] Filed: Aug. 15, 1985

Related U.S. Application Data

[63] Continuation-in-part of Ser. No. 644,008, Aug. 24, 1984.

[51] Int. Cl.$^4$ ............................................. B23B 3/26
[52] U.S. Cl. ................................... 29/27 C; 82/1.2; 82/2 E; 408/13; 409/190; 409/218
[58] Field of Search ............. 29/26 A, 27 C; 74/666, 74/440; 409/218, 70, 190, 76, 143; 408/13, 125, 42, 135, 11; 82/1.2, 2 E

[56] References Cited

U.S. PATENT DOCUMENTS

| 1,147,896 | 7/1915 | Schroeder | 74/666 X |
| 4,245,938 | 1/1981 | Kriegl et al. | 409/218 X |
| 4,509,236 | 4/1985 | Morita et al. | 29/26 A |
| 4,616,385 | 10/1986 | Wheeler | 29/27 C |

FOREIGN PATENT DOCUMENTS 59-327  4/1984  Japan .................................. 409/218

Primary Examiner—Gil Weidenfeld
Assistant Examiner—Glenn L. Webb
Attorney, Agent, or Firm—Edwin E. Greigg

[57] ABSTRACT

A drilling attachment for use with a machine tool that rotates a workpiece in which the drilling apparatus is moved into an operative position to the workpiece by means of the machine tool slide and is rotated with the workpiece so that a drilling member associated with the rotating drilling apparatus is caused to rotate and to enter the workpiece while the same is rotating. The drive means for rotating the drill collet includes an idler gear which allows a greater work area between the rotating portion of said drill attachment and the drill collet on the drill attachment.

12 Claims, 5 Drawing Figures

ROTARY SYNCHRONOUS CROSS DRILLING ATTACHMENT

CROSS REFERENCE TO RELATED PATENT APPLICATION

This application is a continuation-in-part of application Ser. No. 644,008 filed Aug. 24, 1984.

BACKGROUND OF THE INVENTION

The present invention relates to an apparatus for drilling a hole or holes in a workpiece that is normally fixed to a rotating spindle.

Normally, in such operations when it is desired to drill a cross hole in a workpiece that is rotating with a spindle, the spindle is stopped so that the cross drilling operation can be initiated, and when the cross drilling operation is completed the spindle is again rotated so that whatever tooling operation, for example, diameter reduction or threading, associated with the spindle rotation can be continued. It is obvious, therefore, that in the attempt to provide a finished product that is both tooled and cross drilled for a specific purpose two separate tooling operations are necessary, one of which requires the other to be terminated or interrupted before the one can commence.

A need therefore exists in which such separate tooling operations can be implemented in a single time saving operation so that both operations can be performed precisely and efficiently.

SUMMARY OF THE INVENTION

The present invention overcomes the aformentioned disadvantages by providing an apparatus which will allow the cross drilling operation to be performed while the workpiece is still rotating. In this way the rotation of the workpiece need not be stopped or interrupted while another tooling operation is being performed automatically. Thus, the purpose of the invention is to perform a cross drilling operation in a workpiece automatically while the workpiece is rotating.

The invention when used in combination with other attachments makes it possible to produce machine parts complete with cross holes, flats, hex contours, etc., in a single operation by providing a rotary synchronous drilling tool mounted on the main slide of an automatic screw machine, which tool is adapted to advance to a correct location for a drill to enter the workpiece while rotating therewith by means of a hinged gearing system. As a consequence, a hole or holes or such other cross drilling operations will be drilled at right angles to the centerline of a workpiece that would, under normal conditions, be done on a drilling machine as a secondary operation after the automatic operations are performed.

Accordingly, it is an object of the present invention to provide an apparatus for cross drilling a hole or holes in a workpiece at the same time that an automatic tooling operation is being performed. It is a further object of the invention to provide a rotary synchronous cross drilling attachment for machine tools in which the attachment rotates with the workpiece to thereby effect a cross drilling operation during the automatic tooling operation or before the automatic tooling operation is completed. It is yet a further object of the invention to provide an apparatus for cross drilling in a rotating workpiece in a single operation that combines both translatory and rotary movement of the apparatus with respect to the rotating workpiece.

Another object is to position the drill head so that holes may be drilled in elongated parts along its length.

The invention will be better understood as well as further objects and advantages thereof become more apparent from the ensuing detailed description taken in conjunction with the drawings.

DETAILED DESCRIPTION

Figure 1:
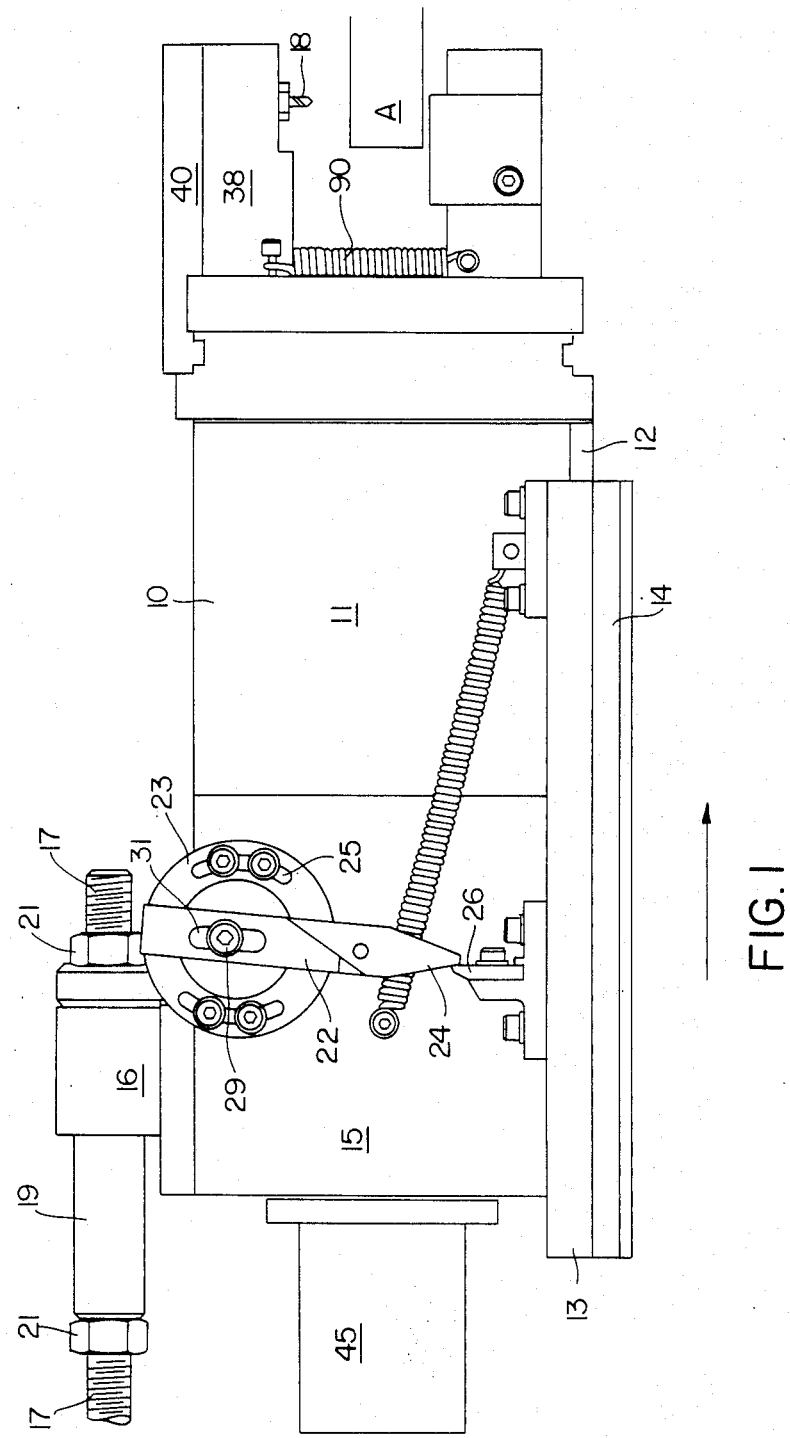
FIG. 1 is a right side elevational view of the cross drilling tool according to the invention.
Figure 2:
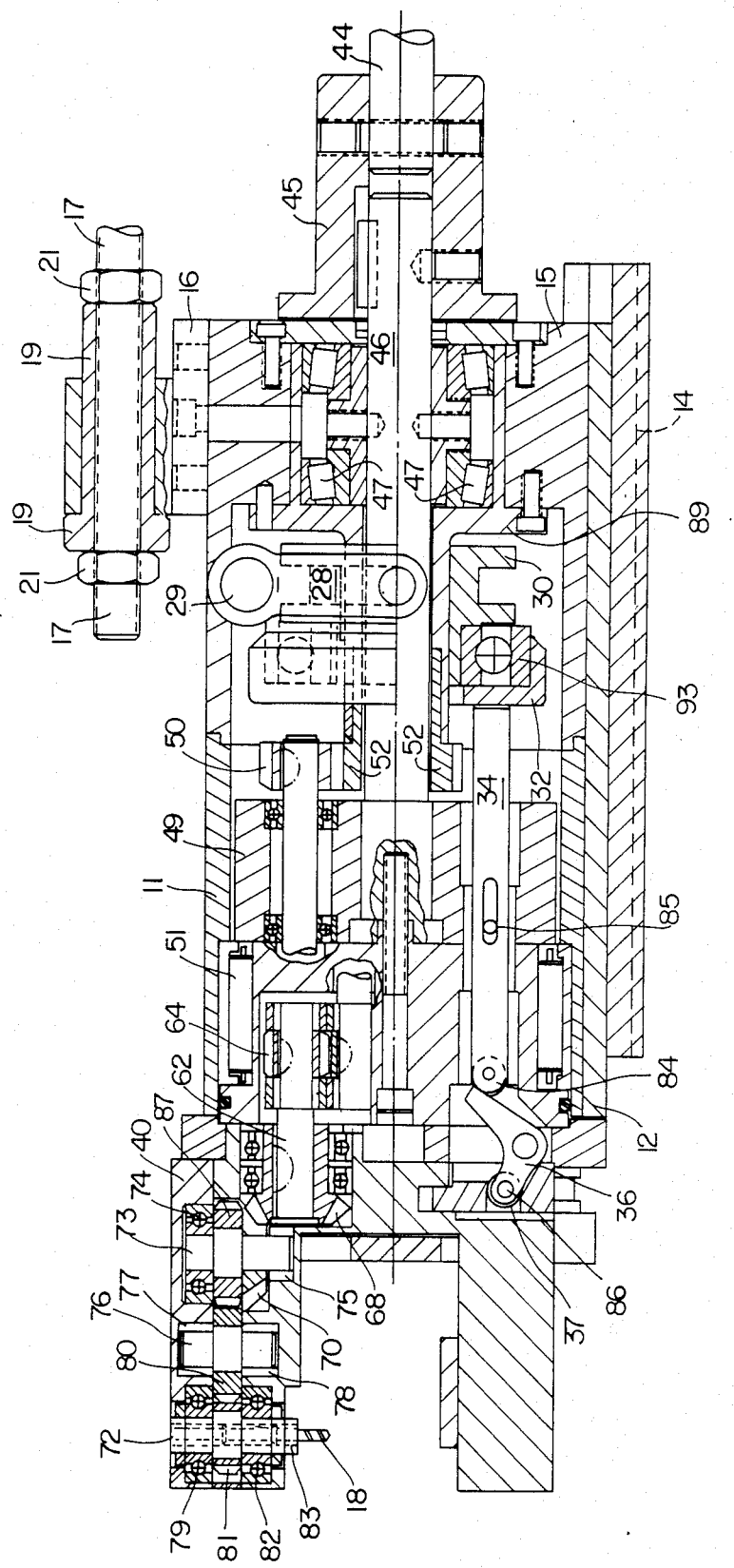
FIG. 2 is a cross-sectional view of the apparatus shown in FIG. 1.

Referring now to FIG. 1, there is shown a drilling apparatus 10 in two sections, a forward section 11 and a rearward section 15, both of which are mounted on a slidable base 12, better shown in FIG. 2, which in turn is mounted on the main tool side base 14 which is secured to main tool slide of an automatic screw machine or the like, not shown. An adjustable stop 16 is shown mounted on the top of the drilling apparatus and secured thereto at the opposite end from the drill 18. The adjustable stop includes a bushing 19 which is journaled in stop 16 and one end of a threaded rod 17 that is secured to the body of the screw machine passes through the bushing 19. The position of the rod 17 is adjusted relative to the bushing by means of the screw nuts 21 located on either end of the bushing 19. The bushing 19 is provided with a flange end to stop the movement of the bushing in a direction toward the screw machine. The adjustable stop mechanism 16 acts to stop the forward advance of the drilling apparatus 10 at the correct location for the drill 18 to enter the workpiece A.

Figure 3:
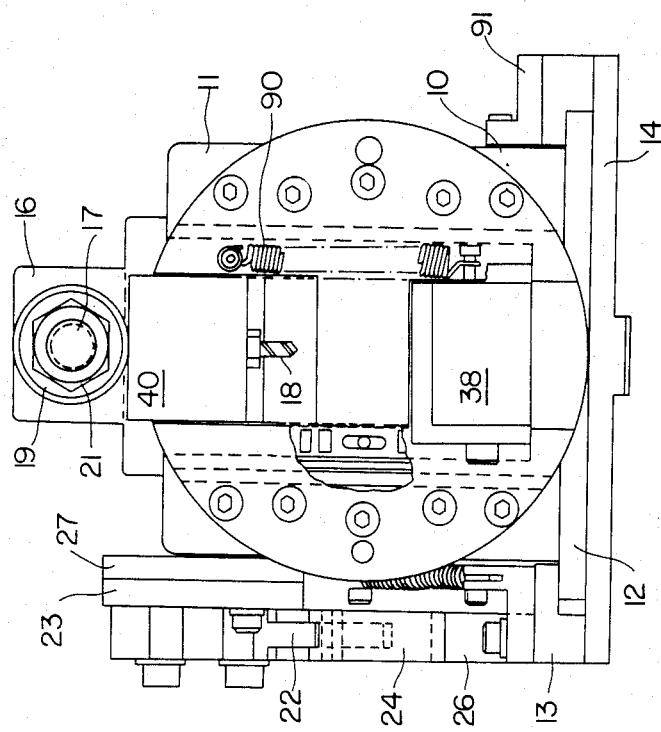
FIG. 3 is a front elevational view of the apparatus shown in FIG. 1.

While the drilling tool 10 is stopped at the correct location for drilling, the main machine tool slide which supports base 14 continues to advance in the direction indicated by the arrow, and the lever 22 which connects with the drill positioning mechanism, to be explained below, is contacted by an adjustable trip dog stop member 26 which is secured to the main tool slide mounting base 14 via the lug portion 13, as best shown in FIG. 3. The lever 22 is thus pushed forward by the trip dog 26, and as best shown in FIG. 2, the lever swings a yoke member 28 to which it is attached via a pin member 29, allowing the other end of the yoke member 28 to ride via a suitable cam member in the annular cam-follower member 30 which moves axially within the housing 15, to be more fully described below, and which supports the bearing collar member 32. As the yoke member 28 swings forward by means of the lever 22 being acted upon by the trip dog 26, the bearing collar 32 acted upon by the cam-follower member 30 is caused to move forward in the direction of the arrow, thereby pushing the push rod 34 forward which bears against the bell crank 36 causing it to pivot, and which is secured in an aperture in a frame of slide member 38 which by means of the ball and socket joint 37, pulls the slide member 38 via a hinged gear frame, to be described below, and hence the rotating drill mechanism 40 towards the workpiece A.

The lever 22 is provided with a slot 31 so that it can be longitudinally adjustable with respect to the dog stop 26, and further a ring support 23 supports the lever 22 so that it can be rotatably adjusted as well with respect to the dog trip member 22. Arcuated slots 25 and suitable screw bolt members extending therethrough allow for the necessary adjustment; the screw bolts can be secured to suitably provided holes in a stationary ring member 27 supported on the housing 15, as shown in FIG. 3.

Figure 5:
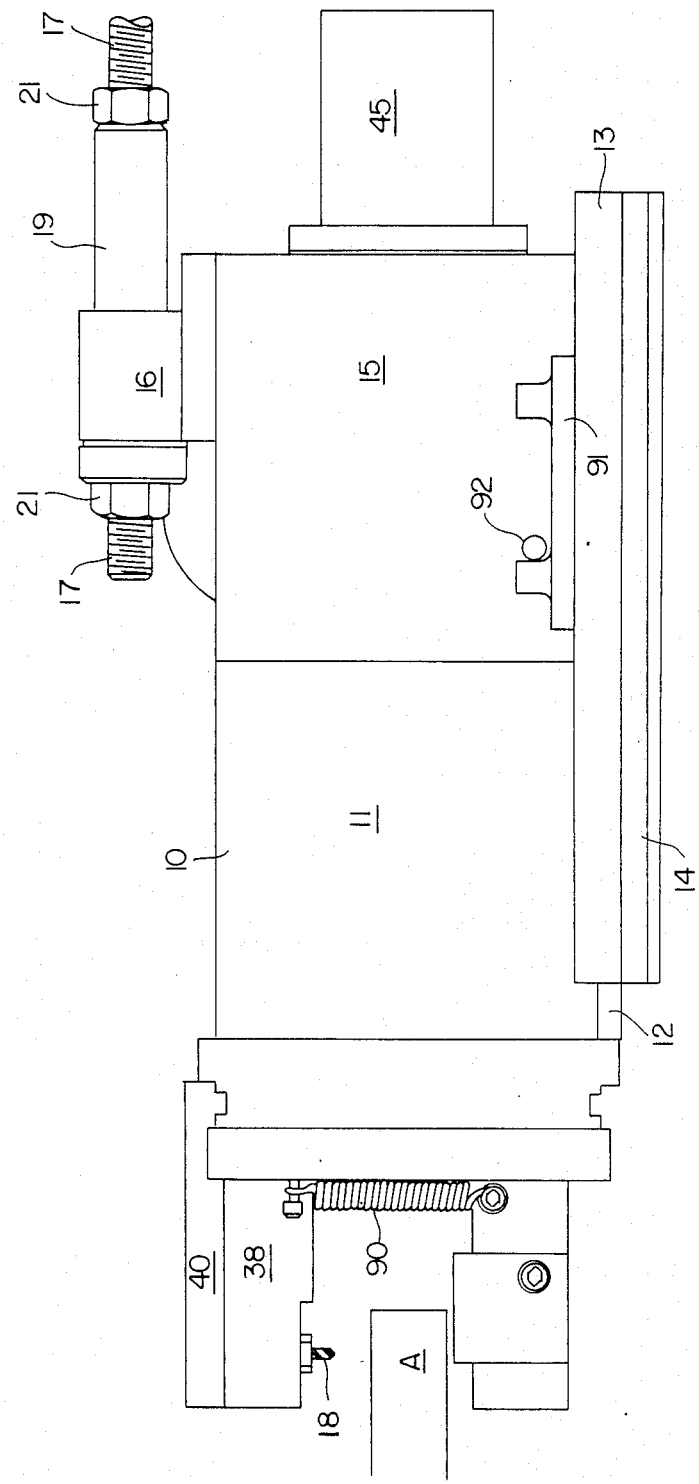
FIG. 5 is a left side elevational view of the apparatus shown in FIG. 1.

As the main tool slide mounting base 14 continues to advance, and after the cross drilling operation above described is completed, the lever swings on past the trip dog stop member 26 and the drilling slide member 38 is returned to its inoperative position by means of the spring 90, thus allowing the main tool side mounting base 14 to retract while the drill 18 is disengaged from the workpiece A. The lever 22 is provided with a hinged end portion 24, as shown in FIG. 1, which permits the lever to pass over the dog trip member 26 as the latter passes by when the main tool slide mounting base 14 retracts until the stop bracket 91 shown in FIG. 5 contacts stop pin 92 and then the main drilling attachment 10 is retracted the balance of the main tool slide stroke.

The rotary drive of the drill is accomplished by the gearing in the housing 11 which will now be explained. The spline shaft 44 extends from a gear box on the rear of the automatic screw machine, not shown, and is turned thereby and therefore constantly rotated at a one-to-one ratio with the machine spindle and the workpiece A. The spline 44 is connected via bushing member 45 to one end of a shaft 46 which is mounted for rotation within the bearings 47 of the housing 15, as shown in FIG. 2. The shaft 46 is connected to a rotor member 49 at its inner end and the rotor member itself is supported for rotary movement by bearings 51 on the periphery thereof. The rotor 49 is seen to contain the push rod 34 for axial movement therein as well as a rotary shaft 48 having a pinion gear 50 fixedly attached on the rear end thereof which meshes with a sun gear 52 secured to flanged adapter 89 which is bolted to the the interior of the housing 15, as shown.

Figure 4:
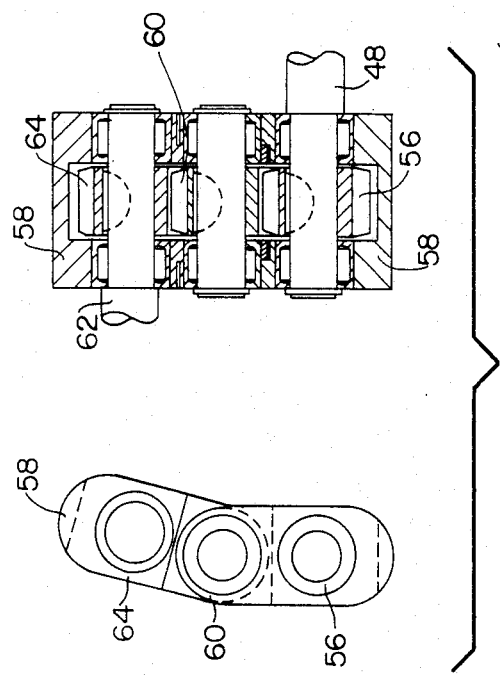
FIG. 4 is a detailed view, partially in cross-section, of a hinged gear frame device which permits drilling desired depths during rotation of the workpiece.

The front end of the shaft 48 drives a spur gear 56, as best shown in FIG. 4, which is one of three gears contained in the hinged gear frame 58 shown in FIG. 4, that is located within the rotor body 49, as shown in FIG. 2. The hinged gear frame 58, as best shown in FIG. 4, includes two other spur gears 60 and 64, the gear 60 being at the hinge point of the gear frame. Thus, the hinged gear frame 58 allows the drill member 40 and hence the drill 18 to be moved inward or outward while drilling. Rotation of the drill itself is accomplished by means of the spur gear 64 which is located on the rear of a shaft 62 which in turn has a bevel gear 68 positioned on the front end thereof, as best shown in FIG. 2. The bevel gear 68 drives a corresponding vertically disposed bevel gear 70 fixedly mounted on the rotary shaft 73 which is supported by suitable bearings 74 and 75. A spur gear 87 is attached and keyed on vertical shaft 73. Spur gear 87 drives an idler gear 80 then drives gear 81 which is keyed to constantly rotating spindle 72 which is supported in bearings 79 and 82. The spindle 72 has secured to its outer end collet 83. The drill 18 is secured in collet 83 and rotated thereby as the gear 81 is driven by the drive chain. The drill 18 is moved in and out of the workpiece A secured in a rotating head.

In order to control vibration, a counter balance 38 has been added to the rotatable part below the drill.

In operation, the rotary synchronous drilling attachment is mounted on the main tool slide of an automatic screw machine and is driven by the spline shaft 44 at a ratio of 1:1. The main tool side of the automatic screw machine advances toward the workpiece A, the adjustable stop stops the forward movement of the drilling attachment in the correct adjusted position for drilling a hole in the workpiece. While the rotary synchronous drilling attachment stands at the stopped position, the main tool side of the machine continues to advance. As the main tool slide continues to advance, the trip dog 26 secured to the main tool slide contacts the hinged end portion of lever 22 which rotates lever 22. Lever 22 swings yoke 28 which contains bearing collar 30 forward which engages push rod 34 to move the push rod forward. Push rod 34 engages ball crank 36 to rotate the ball crank about its pivot by which the ball socket joint 37 forces the rotatable end side 38 downwardly. As the slide 38 is forced downwardly the drill is moved toward and into the workpiece thereby drilling a hole at the desired location and at the desired depth. Once the trip dog moves beyond the lever 22, the yoke returns to its position and the drill is moved to its normal non-drilling position by spring 90. The trip dog 26 is permitted to move back by the lever 22 because of the hinged end portion which is pivotable about a pin. The hinged end portion is held from rotation except when the machine slide moves back to the start position.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. A rotary synchronous cross drilling apparatus for use with a machine tool assembly including a main tool slide and having a synchronous rotating workpiece, comprising a movable slide operative on said main tool slide member for slidably supporting said drilling apparatus parallel to a workpiece and advancing said drilling apparatus towards and away from said workpiece at a right angle thereto, a stop means for arresting said drilling apparatus at a desired location with respect to said workpiece and said moveable slide member, said drilling apparatus having a rotary portion and a means for rotating said rotary portion, a drill means including means for rotating said drill means and having a movable support means therefor disposed on said rotary portion of said drilling apparatus, actuating means disposed in said drilling apparatus and responsive to the location of said movable slide member for actuating said movable support means at said desired location, whereby said drill means is moved toward and away from said rotating workpiece, said means for rotating said drill means includes an idler gear between a spur gear and a gear means for rotating a collet to which a drill bit is secured, and a stop bracket on said movable slide member operative relative to a stop pin for retracting said movable slide member with said main tool slide.

2. A drilling apparatus according to claim 1, wherein said stop means comprises an adjustable means for adjusting the arrested position of said critical location.

3. A drilling apparatus according to claim 1, wherein said means for rotating said rotary portion comprises a spline member associated with said machine tool assembly.

4. A drilling apparatus according to claim 1, wherein said rotary portion comprises a rotary shaft member and a rotor member affixed to one end thereof, said rotor member including a first drive shaft having a pinion gear at one end thereof for meshing engagement with a stationary sun gear affixed to said drilling apparatus.

5. A drilling apparatus according to claim 4, wherein said movable support means comprises a hinged gear frame means, and said first drive shaft further having a spur gear affixed at the other end thereof for meshing engagement with said hinged gear frame means.

6. A drilling apparatus according to claim 5, wherein said hinged gear frame means comprises a plurality of spur gears.

7. A drilling apparatus according to claim 4, wherein said means for rotating said drill means comprises a first bevel gear means affixed to a shaft for said drill means and a second bevel gear means affixed to a second drive shaft extending from said hinged gear frame means and said idler gear is positioned between said second bevel gear and said gear means for rotating said collet.

8. A drilling apparatus according to claim 4, wherein said actuating means comprises a push rod assembly rotatable with said rotor member and having a bell crank means for engaging said movable support means, said push rod assembly being acted upon by an axially movable bearing means, and lever means actuated by a trip means disposed on said movable slide member for actuating said movable bearing means.

9. A drilling apparatus according to claim 8, wherein said movable bearing means is slidable on said rotary shaft.

10. A drilling apparatus according to claim 8, wherein said lever means includes an adjusting means for adjusting said lever means with respect to said trip means.

11. A drilling apparatus according to claim 8, wherein said trip means comprises an adjustable support means therefor.

12. A drilling apparatus according to claim 8, wherein said lever means comprises a hinged portion for passing over said trip means in one direction and positively engaging said trip means in an opposite direction.

* * * * *